May 13, 1947. A. HUGGENBERGER 2,420,375
AIRCRAFT OXYGEN REGULATOR
Filed Sept. 2, 1944
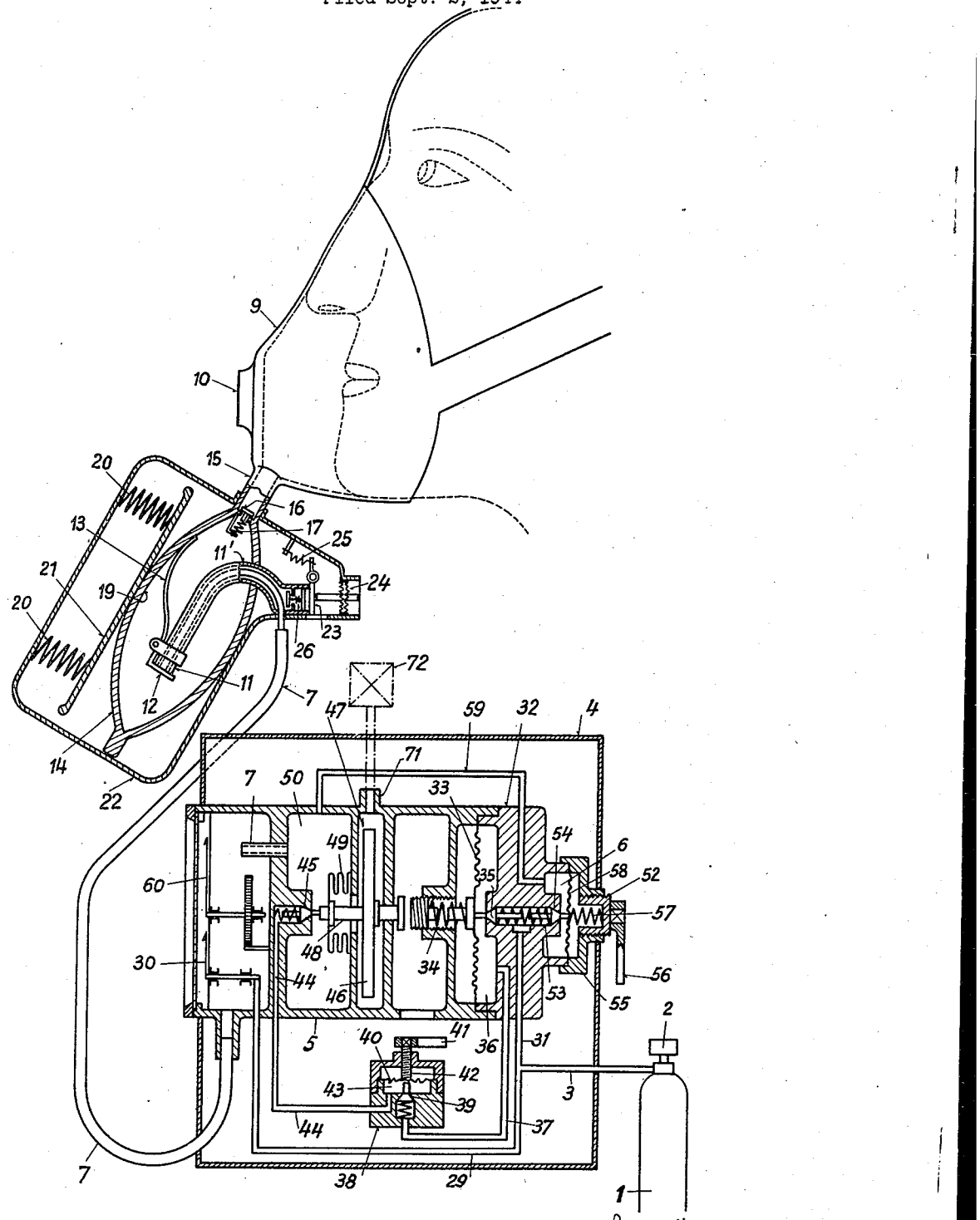

Patented May 13, 1947

2,420,375

UNITED STATES PATENT OFFICE 2,420,375

AIRCRAFT OXYGEN REGULATOR

Arnold Huggenberger, Zurich, Switzerland

Application September 2, 1944, Serial No. 552,396

7 Claims. (Cl. 137—153)

The present invention relates to a new and improved aircraft oxygen regulator for one man operation, opening automatically at a predetermined altitude and automatically supplying a mixture of air and oxygen to the user according to the altitude. The regulator is intended for administering oxygen through a mask operating on reduced tank pressure.

It is well known that at an altitude of say 4000 meters life-sustaining gases that is mixtures of oxygen and air or of oxygen, air and carbon-dioxid have to be supplied to a pilot to keep up his physiological efficiency. The amount of gas-mixture to be delivered depends largely on the altitude and of the work to be performed by the pilot.

Equipments to administer gas are known to supply a proper breathing gas mixture to suit the needs of the respective user. The equipment known comprises tanks containing the breathing gas at a very high pressure and suitable increase-decrease valves to reduce the tank pressure sufficiently to have the gas at a low pressure simulating air pressure on the ground.

There are two types of regulators known. In one set of regulators the gas administration is effected automatically by a lung-controlled device and in a second type of regulators the flow of gas to the mask of the pilot is controlled by an aneroid unit according to the altitude.

The present invention relates now to an improved device combining the action of both the said devices.

The main object of the invention consists in the provision of a device which ensures an automatic supply of oxygen and air or of a mixture of oxygen, air and carbon-dioxide sufficient to the pilot even while engaged in strenuous work.

In the accompanying drawing a device is shown diagrammatically parts being shown in section.

The gas to nourish the pilot is stored under pressure in a supply tank 1. The gas passes from the tank 1 through a shut-off valve 2 and a pipe 3 to an automatic pressure reduction device 4 and from there through a valve 5, which is controlled by an aneroid assembly 46 and a tube 7 to the mouthpiece mask 9 by which the gas is administered. The aneroid assembly 6 opens the flow automatically at approximately say 4000 meter altitude and automatically supplies the gas from the tank 1 to the mask 9 at a predetermined constant pressure.

In the tube 7 leading to the mask 9 an automatic-lung controlled valve is arranged which allows the passage of gas to the mask 9 in proportion to the gas-air mixture necessary by the pilot for breathing and to keep up his physiological efficiency.

The mask 9 is provided with a breath-outflow valve 10 consisting of a thin disk of light material for instance of mica. The disk is held on its seat by an adjustable spring. The pressure of the spring is low but sufficient that in breathing-out a low pressure within the mask 9 is created. This is assisted by a non-return valve 16 built into the gas supply socket 15 of the mask 9. The valve 16 comprises a disk of mica actuating against the pressure of a spring 17.

The lung-controlled automatic gas supply regulator comprises a valve disk 12 controlling a nozzle 11 of a supply tube 7. The disk 12 and the nozzle 11 are within an expansible bag 14 of elastic, gas tight material for instance of india-rubber. The bag 14 is connected to the mask 9 by a short tubular connecting piece 15 in which the non-return valve 16, 17 is arranged. The valve disk 12 is provided with a lever 13 contacting with the wall 19 of the bag 14. Against the wall 19 a plate 21 is pressed by springs 20 arranged in a casing 22 containing the bag 14. By breathing-in, gas is drawn by the pilot from the bag 14. The pressure within the bag 14 is reduced, the springs 22 expand and by the wall 19 of the bag 14 the lever 13 is moved to lift the disk 12 from the nozzle 11. Gas enters now the bag 14 by the tube 7 in true proportion to the amount of gas used by the pilot.

The valve 10 of the mask 9 is set in such a manner that at the first phase of the breathing-out the exhaled gas is first collected in the bag 14, the non-return valve 16, 17 closing only during the second phase.

The gas exhaled during the first phase is still pure or very nearly so and contains oxygen while only the gas exhaled during the second phase is not to be used again and passes through valve 10 out of the mask 9. The aneroid controlled valve supplies sufficient gas to meet the maximum demand made by the pilot. By this arrangement a very economical use of the available gas supply is made. A further saving of oxygen may be effected by making use of a mixture of oxygen and fresh air when flying at altitudes say below 6000 meters. To introduce fresh air into the bag 14 the nozzle 11 is provided with a jacket 11' which communicates with a non-return valve 26 controlled by an aneroid unit 24. The latter operates the valve body 23 which is closed against the action of a spring 25 as soon as the predetermined altitude has been reached. The inflow of air into the nozzle 11 is effected by the oxygen passing into the bag 14 the fresh air being sucked in by opening the non-return valve 26. The valve disk 23 is closed and is kept closed by a pin of the aneroid assembly 26 in known manner as soon as the aircraft is flying above the said altitude.

By the pressure reduction device 4 oxygen gas is delivered to the mask 9 under a pressure suitable for breathing. The oxygen flows from the tank 1 and pipe 3 by a pipe 29 to a pressure gage 30 and by a channel 31 to a reducing valve 32. The valve 32 comprises a chamber 36 in which a diaphragm 33 is arranged. On the diaphragm 33 abuts the free end of the stem of a valve body 35 which under the action of a spring tends to close the communication-channel between the channel 31 and the chamber 36. On the diaphragm 33 acts moreover a spring 40 the pressure of which may be adjusted by a screw threaded plug. From the chamber 36 a pipe 37 leads the expanded oxygen gas to the main valve 38. The latter comprises a chamber 43 closed by a diaphragm 40. On the one side of the diaphragm abuts the stem of a valve body 39 which under the action of a spring closes the influx of oxygen into the chamber 43. To open the valve 38 a screw threaded spindle 42 is provided to which a handle 41 is attached. By turning the spindle 42 the diaphragm 40 is displaced and also the valve body 39 allowing oxygen to enter the chamber 43 and to flow by pipe 44 to a chamber 50. The pipe 44 is closed by a spring actuated valve 45 and may be opened by the action of an aneroid unit 46 placed within a chamber 47 open to the atmosphere. The aneroid operates a stem 48 abutting on the bottom of a metallic bellows 49. The stem 48 operates the valve 45 and controls the influx of oxygen into the chamber 50. The chamber 50 communicates with the pipe 7 leading to the lung-controlled valve device 11, 12, 13, 14. If the aircraft has attained an altitude say of about 4000 meters the aneroid 46 will open the valve 45 and if the main valve 38 has been operated by handle 41 oxygen will flow from the tank 1 to the bag 14 at a reduced pressure and in such a measure that the pilot will have an ample supply even if he is breathing most heavily in extreme exertions etc.

The pressure reduction device comprises an emergency by-pass valve 55 which may be actuated by a handle 56. The channel 31 delivers oxygen from the tank 1 into a bore 53 closed by a valve body 54. Against the valve body 54 abuts a diaphragm 58 which stands under the action of a spring 57. The latter may be compressed by a plug 52 screwed into the wall of the casing of the valve 55 and carrying a handle 56. By turning the handle 56 the pilot may open the valve 54 and oxygen flows into chamber 6, pipe 59, and further through tube 7 into the bag 14. This flow is not affected by the pressure reduction mechanism but delivers oxygen and therewith fresh air to suit the needs of the pilot at a pressure to be read off on the dial of a gage 60 of the device while the pressure in the supply tank 1 is indicated on the dial of the gage 30.

The device 4 is installed in convenient reach and view of the flying personnel. There should be a loop in the tube 7 to allow flexibility and relieve possible strain at the connection.

The chamber 47 is provided with a socket 71 to which a vacuum device 72 not shown in the drawings may be connected. The pressure in the chamber 47 may be reduced to simulate any altitude. The aneroid assembly 46, 48, 49 may be adjusted on the ground to open the oxygen supply at any predetermined altitude.

The valve 10 is placed under a pressure sufficient to create a slight pressure within the mask 9.

What I wish to secure by U. S. Letters Patent is:

1. A breathing device comprising within a casing, a collapsible breathing bag provided with a discharge tube for connection with a respiratory zone, a check valve in said discharge tube closing toward said breathing bag, a spring-actuated plate engaging the exterior of sad bag and effective to assist in collapsing said bag when said check valve is opened, a nozzle connectable to a source of respirant gas under pressure extending with its discharge end into said bag, a valve pivotally mounted on said nozzle and controlling the discharge end thereof, and means actuated by said bag when it is being collapsed to open said valve, whereby said nozzle is adapted to introduce a charge of respirant gas into said bag.

2. A breathing device comprising within a casing, a collapsible breathing bag provided with a discharge tube for connection with a respiratory zone, a check valve in said discharge tube closing toward said breathing bag, a spring-actuated plate engaging the exterior of said bag and effective to assist in collapsing said bag when said check valve is opened, a nozzle connectable to a source of respirant gas under pressure extending with its discharge end into said bag, a valve at the discharge end of said nozzle, and means controlled by said collapsible breathing bag for opening said valve when said bag is being collapsed, whereby a charge of respirant gas is admitted to said bag and expands the same when said check valve is being closed, and for closing said valve when said bag reaches its expanded position.

3. A breathing device comprising within a casing, a collapsible breathing bag provided with a discharge tube for connection with a respiratory zone, a check valve in said discharge tube closing toward said breathing bag, a spring-actuated plate engaging the exterior of said bag and effective to assist in collapsing said bag when said check valve is opened, a nozzle connectable to a source of respirant gas under pressure extending with its discharge end into said bag, a valve pivotally mounted on said nozzle and controlling the discharge end thereof, and a lever arm on said valve engaging the inner wall of said collapsible bag, whereby said valve is opened to admit a charge of respirant gas into said bag when said bag is being collapsed upon opening of said check valve.

4. A breathing device comprising within a casing, a collapsible breathing bag provided with a discharge tube for connection with a respiratory zone, a check valve in said discharge tube closing toward said breathing bag, a spring-actuated plate engaging the exterior of said bag and effective to assist in collapsing said bag when said check valve is opened, a nozzle connectable to a source of respirant gas under pressure extending with its discharge end into said bag, a valve pivotally mounted on said nozzle and controlling the discharge end thereof, means actuated by said bag when it is being collapsed to open said valve, whereby said nozzle is adapted to introduce a charge of respirant gas into said bag, and means for introducing atmospheric air from the outside of said casing into said bag when said last named valve is being opened.

5. A breathing device comprising within a casing, a collapsible breathing bag provided with a discharge tube for connection with a respiratory zone, a check valve in said discharge tube closing toward said breathing bag, a spring-actuated plate engaging the exterior of said bag and effective to assist in collapsing said bag when said check valve is opened, a nozzle connectable to a source of respirant gas under pressure extending with its discharge end into said bag, a valve pivotally mounted on said nozzle and controlling the discharge end thereof, means actuated by said bag when it is being collapsed to open said valve, whereby said nozzle is adapted to introduce a charge of respirant gas into said bag, means for introducing atmospheric air from the outside of said casing into said bag when said last named valve is opened, and an aneroid controlled valve for rendering said last named means inoperative when the atmospheric air pressure drops below a predetermined value.

6. A breathing device comprising within a casing, a collapsible breathing bag provided with a discharge tube for connection with a respiratory zone, a check valve in said discharge tube closing toward said breathing bag, a spring-actuated plate engaging the exterior of said bag and effective to assist in collapsing said bag when said check valve is opened, a tubular conduit extending with one end into said bag and having its other end secured to the casing and in communication with the atmosphere, a nozzle connectable to a source of respirant gas under pressure and mounted with its discharge end concentrically within the end of the tubular conduit which extends into said collapsible bag, a valve disc mounted for pivotal movement on said tubular conduit within said bag and closing the inner end thereof and also the discharge end of said nozzle when said bag is expanded, said valve disc having a lever arm thereon which engages the inner wall of said bag, whereby said valve disc is moved to open position when said bag is being collapsed to permit the admission of atmospheric air and respirant gas through said tubular conduit and nozzle respectively, into said bag.

7. A breathing device as claimed in claim 6, including a normally open valve at the end of said tubular conduit which is in communication with the atmosphere, and an aneroid attached to said casing for controlling said valve and closing the same when the atmospheric pressure drops below a predetermined value.

ARNOLD HUGGENBERGER.

REFERENCES CITED

The following references are of record in the file of this patent:

UNITED STATES PATENTS

| Number | Name | Date |
| --- | --- | --- |
| 1,225,269 | Paul et al. | May 8, 1917 |
| 2,269,500 | Wildhack | Jan. 13, 1942 |
| 2,185,997 | Heidbrink I | Jan. 9, 1940 |
| 2,324,389 | Heidbrink II | July 13, 1943 |